United States Patent [19]

Drouillard et al.

[11] Patent Number: 5,660,747

[45] Date of Patent: Aug. 26, 1997

[54] METHOD OF LASER MARKING OF PRODUCE

[75] Inventors: Greg Drouillard, Lakeland, Fla.; Rowland W. Kanner, Guntersville, Ala.

[73] Assignee: Atrion Medical Products, Inc., Arab, Ala.

[21] Appl. No.: 334,563

[22] Filed: Nov. 4, 1994

[51] Int. Cl.$^6$ .................................................. B23K 26/08
[52] U.S. Cl. ........................................................ 219/121.69
[58] Field of Search ...................... 219/121.68, 121.69; 347/256

[56] References Cited

U.S. PATENT DOCUMENTS

| | | | |
|---|---|---|---|
| 4,636,043 | 1/1987 | Bellar | 219/121.68 |
| 5,021,631 | 6/1991 | Ravellat | 219/121.68 |
| 5,120,928 | 6/1992 | Piliero | 219/121.68 |
| 5,198,843 | 3/1993 | Ito et al. | 347/256 |

FOREIGN PATENT DOCUMENTS

| | | | |
|---|---|---|---|
| 2654662 | 5/1991 | France | 219/121.67 |
| 3836821 | 5/1990 | Germany . | |
| 1-108940 | 4/1989 | Japan . | |
| 5-146887 | 6/1993 | Japan | 219/121.68 |
| 2033185 | 3/1993 | Spain . | |

OTHER PUBLICATIONS

Lumonics brochure for the LightWriter® SP/SPe, No Publication Date.
Lumonics brochure for the LightWriter™ CO$^2$, No Publication Date.
Lumonics brochure for the LaserMark 960, No Publication Date.
Lumonics brochure—The LaserMark BD-60 Programmable Beam Delivery Unit for Large Area Marking, No Publication Date.
Lumonics brochure for the LightWriter®, No Publication Date.

*Primary Examiner*—Geoffrey S. Evans
*Attorney, Agent, or Firm*—Trexler, Bushnell, Giangiorgi & Blackstone, Ltd.

[57] ABSTRACT

A method of marking the skin of a piece of produce with an identifying mark includes the steps of: providing a piece of produce; providing a laser which emits a high intensity light beam to mark the skin of the produce and which laser light beam can be controlled such that a depth of the mark formed on the skin is controlled; relatively moving the piece of produce and the laser; directing the laser light beam along a predetermined path along the produce skin which corresponds to the identifying mark to be applied on the produce skin; and controlling the depth the laser light beam impacts the produce skin such that identifying mark does not penetrate completely through the produce skin to the meat of the produce. Movement of the piece of produce is effected past the laser device while effecting movement of the laser device relative to the piece of produce. To mark the produce skin, the color of an area of the produce skin may be changed to form the identifying mark or the skin may be etched to form the identifying mark.

4 Claims, 2 Drawing Sheets

U.S. Patent    Aug. 26, 1997    Sheet 1 of 2    5,660,747
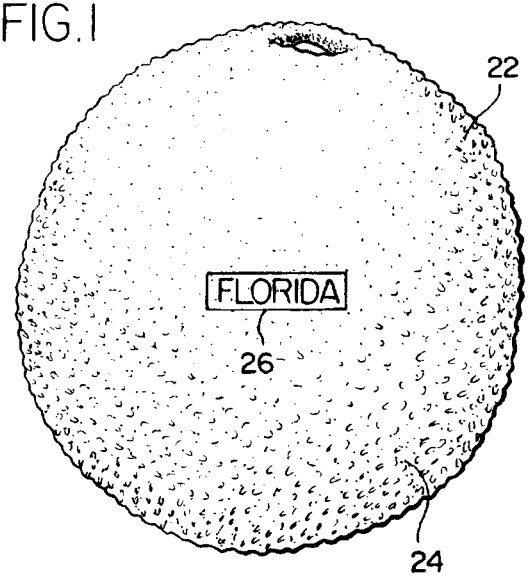
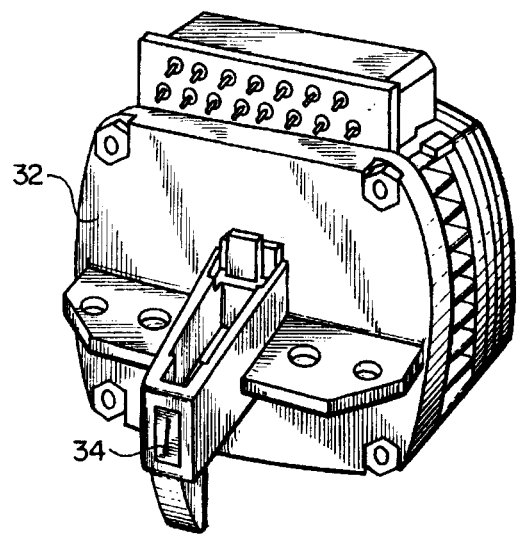
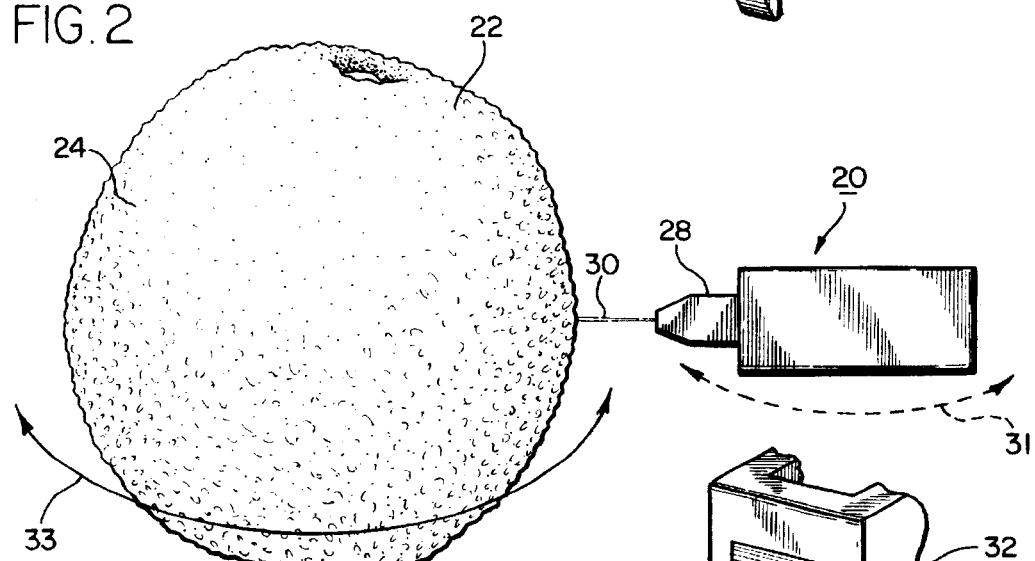
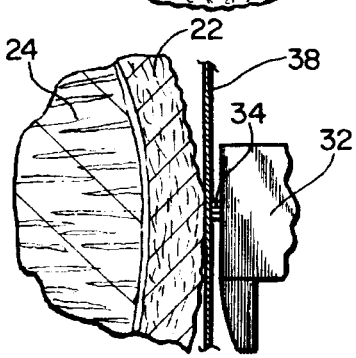
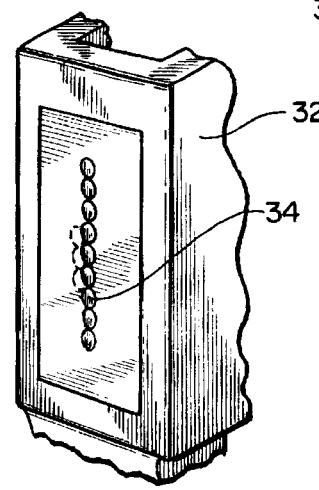

5,660,747

METHOD OF LASER MARKING OF PRODUCE

BACKGROUND OF THE INVENTION

This invention is generally directed to an apparatus and method for marking produce, i.e. fruits and vegetables, with identifying marks using "ink free" techniques. More particularly, the invention contemplates a produce marking system utilizing "ink free" techniques ranging from lasers to dot matrix printers.

The Grocers Association requires that a number, called a price look-up ("P.L.U.") number, be put on all types of fruits, especially citrus, and some types of vegetables. The Grocers Association requires this number so it can merchandise different sizes and types of produce. P.L.U. numbers allow a check-out clerk to identify fruits and vegetables quickly and easily. A store may have the P.L.U. numbers and the associated identifying data entered into a computer. To access the data, the clerk need only read the number on the produce and enter it into the computer. This minimizes loss of money to a retailer due to "giveaways" that result from mixed sizes or types, and minimizes time at the check-out counter which have previously resulted from price checks.

To mark the produce with the P.L.U. number, packers have tried to use adhesive labels bearing the number. Labels, however, are costly and complex to manufacture and attach to the produce. Labels present several other problems, for example, when the packer changes the type of produce they are packing, the packer must physically change all of the labels so that the correct label is eventually attached to the produce. This takes time and manpower to set up. The adhesive on the labels also has the tendency to gum up at the labeler, and be deposited on the belts and machinery, and over time the adhesive builds up on the equipment. Furthermore, when processing plants receive labelled fruit to process, i.e. squeezing fruit to make juice, the labels may clog the extractors. This requires down-time for cleaning and maintenance.

Applicant believes that attempts have been made to directly mark produce with an ink jet printer using edible ink. This type of marking system, however, requires use of an ink which is not sufficiently permanent and smudges.

The present invention is intended to present a novel produce marking system which uses "ink free" techniques. The present invention is intended to overcome or minimize known and inherent problems in prior art produce marking techniques.

OBJECTS AND SUMMARY OF THE INVENTION

A general object of the present invention is to provide a produce marking system which uses "ink free" techniques.

An object of the present invention is to provide a produce marking system which uses a form of energy to change the color pigmentation of the skin of the produce, or alternately, to burn or singe the skin of the produce, such as laser or thermal energy.

Another object of the present invention is to provide a produce marking system that uses a printer head of the general type and kind found in dot matrix printers to burn or singe the skin of the produce, without the transfer of ink to said skin.

A further object of the present invention to provide a produce marking system which is flexible, reliable and efficient.

Briefly, and in accordance with the foregoing, the present invention discloses a novel, ink free produce marking system and method of using the same to mark the skin of a piece of produce with an identifying mark. The first embodiment of the system disclosed herein uses a laser to emit a high intensity light beam to react photochemically and change the color pigmentation of the skin of the produce, or alternatively, to singe the skin of the produce to form the identifiable mark. The second and third embodiments of the system disclosed use a printing head of the type found in a dot matrix printer. In the second embodiment, the pins of the printer head which are at an elevated temperature due to friction or from a separate heating source directly contact the skin of the produce to singe an area of the skin to form the identifiable mark. In the third embodiment, a thermally conductive ribbon is placed between the printer head and the produce. The thermally elevated pins of the printer head may impact the ribbon thereby forming a hot spot on the ribbon, which in turn, singes the skin of the produce to form the identifiable mark.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is an elevational view of a piece of produce which has been marked with an identifying mark made by one of the embodiments of the novel produce marking system disclosed herein;

FIG. 2 is a top, schematic view of a produce marking system which incorporates the features of a first embodiment of the present invention wherein laser energy is used to produce the desired marking;

FIG. 4 is a perspective view of a 9-pin dot-matrix-type printer head which may be employed in the second and third embodiments of the present invention;

FIG. 5 is an partial, enlarged, perspective view of the dot matrix printer head of FIG. 4 illustrating the pin array;

FIG. 9 is a partial, schematic view of the pins of the dot matrix printer head impacting a thermally conductive ribbon which abuts the produce, which is shown in cross-section and partially broken away, in accordance with the third embodiment of the present invention shown in FIGS. 7 and 8.

DETAILED DESCRIPTION OF THE PREFERRED EMBODIMENT

Figure 3:
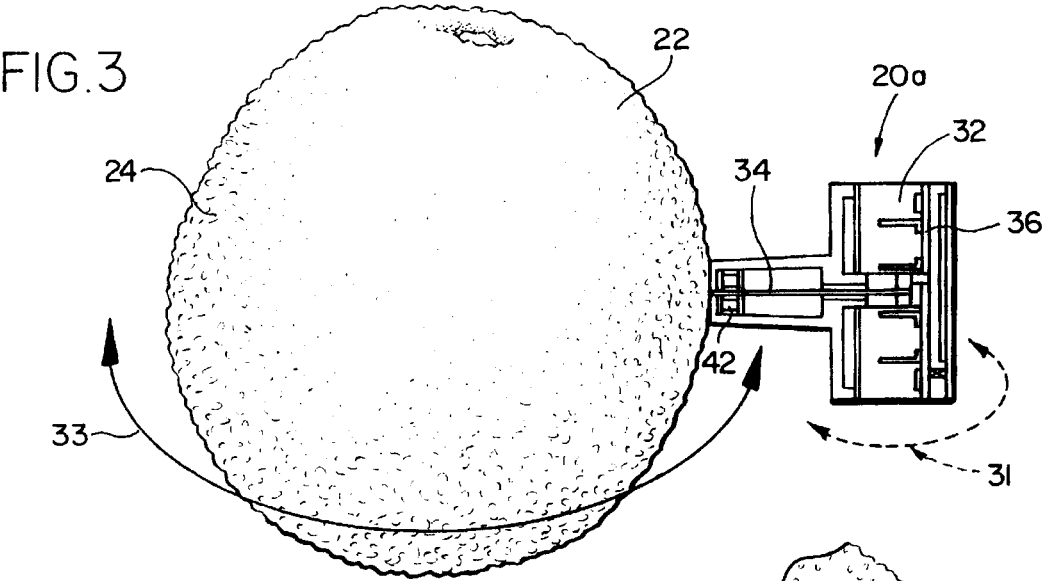
FIG. 3 is a top, schematic view of a produce marking system which incorporates the features of a second embodiment of the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Novel embodiments of a produce marking system 20, 20a, 20b are shown and disclosed herein. The embodiments 20, 20a, 20b of the produce marking system use "ink free" techniques to mark the skin 22 of a piece of produce 24 with an identifying mark or marks 26. By using the term "ink free," this means that no ink, edible or inedible, is used in the process to mark the piece of produce 24. Also, it is to be understood that by using the term "skin" herein, that is synonymous with the terms, "peel," "rind" and the like.

The novel embodiments 20, 20a, 20b of the produce marking system of the present invention can be used to mark a variety of fruits and vegetables. While an orange is shown in the drawings, other fruits can be marked using the system and method described herein, ranging from thick-skinned fruits such as grapefruits and tangerines to thin-skinned fruits such as tomatoes, apples, pears and kiwi. Also, some vegetables may be marked using the disclosed system.

The piece of produce 24 can be marked with a variety of marks 26, such as numbers, letters or bar codes. For example, as shown in FIG. 1, an orange is marked with the word "FLORIDA" surrounded by a rectangular box. Also, for example, the produce 24 may be marked with the four digit P.L.U number as discussed in hereinabove.

The first embodiment 20 of the ink free produce marking system uses a laser 28 as illustrated in schematic form in FIG. 1. The laser 28 is a noncontact, high speed, efficient method of marking a piece of produce 24 and provides a sharply defined, permanent mark 26 on the skin 22 of the piece of produce 24.

The laser 28 uses a high intensity light beam 30 to mark the skin 22 of the produce 24. Depending on the degree of heat generated by the laser 28, the skin 22 of the produce 24 is burned or singed to form the mark 26. Alternatively, the high energy light beam or energy of the laser 28 may be used to photochemically change or alter the color pigmentation of the skin 22 of the produce 24 by bleaching or darkening the skin 22 to create a contrast with the unaffected area of the produce 24.

The laser 28 is connected to and controlled by a suitable computer (not shown). The computer is appropriately preprogrammed to send the correct signals to the laser 28 depending on the size and type of the produce 24 being marked. A wide variety of marks 26 can be created with ease by programming the computer accordingly.

When a new batch of produce 24 is ready to be marked, to alter the type of mark 26, the operator only needs to punch in the correct commands to tell the computer to alter the mark 26 being made by the laser 28. If new marks or codes are to be placed on the produce 24, the computer only needs to be appropriately programmed to generate the new marks. Thus, the laser 28 has a great deal of flexibility. The computer and laser 28 can be combined with a scale (not shown) to further help an operator classify the type of produce 24 to be marked.

It is Applicant's belief that a laser device 28 which will perform in accordance with the disclosure herein is a $CO_2$ or SP/SPe laser manufactured by Lumonics Corporation of Camarillo, Calif., under the trade name "LightWriter®". The LightWriter® laser marking system uses a computer to direct the laser along the media, in the present invention a piece of produce 24, in the desired outline to create a mark or indicia. Of course, other similar type laser marking systems may also be employed.

When using a laser 28, the depth of the mark 26 can be adjusted to that as desired. Thus, the meat of the piece of produce 24 need never be subjected to the laser light beam or energy 30. Furthermore, when it is desired to use the laser to singe the skin of the produce, the heat energy generated by the laser light beam 30 cauterizes the affected area around the mark 26 and thus, decay, disease and fungus are not invited since neither the meat of the produce 24 nor the underlying skin are exposed to oxygen.

To mark the produce 24 properly, it is necessary to employ relative movement or rotation between the piece of produce 24 and the laser 28. Either the laser 28 can move or rotate, as indicated by arrow 31 along a track (not shown) or alternatively, the produce 24 can be rotated as indicated by arrow 33. In either method of relative movement or rotation, the laser 28 emits a high intensity light beam 20 to mark the skin 22 of the piece of produce 24 by either burning or singeing the skin 22 of the produce 24, or alternatively, reacting photochemically with the skin to alter the color pigmentation of the skin 22 of the produce 24 by bleaching or darkening the area of the skin 22 that comes into contact with the light beam 30, while the uncontacted area remains unaffected. When the process is completed, a sharply defined, permanent mark 26 is formed on the skin 22 of the produce 24.

The second and third novel embodiments, 20a and 20b, are illustrated schematically in FIGS. 3 and 4 respectively, which are used to form a permanent mark 26 on the skin 22 of a piece of produce 24. In both embodiments, 20a and 20b, a printing head similar to that as employed with a dot matrix printer will be used. It should be noted however, that standard dot matrix printers employ an ink carrying ribbon, wherein the pins of the printer head impact upon the ribbon to transfer a "dot" of ink to the underlying medium. As the pins of the dot matrix printer move back and forth, the relative temperature of the pins become elevated due to friction, or alternately as contemplated with the present invention, the pins may be heated. As such, a standard dot matrix type printing head has been found to work well in providing an identifying mark on the skin of the produce 24. As such, the present invention envisions the use of a dot matrix printer head 32 to burn or singe the skin 22 of a piece of produce 24. The printer head 32 illustrated in the drawing for use with the present invention is a conventional dot matrix printer head and may use 9 vertically staggered pins 34, as shown in FIG. 5, or may take the form of another conventional type of dot matrix printer such as 24 pin dot matrix printer for a higher quality mark. While the term "pin" is used herein, a pin is also commonly referred to as a "wire" in the dot matrix printer head industry.

Since a conventional dot matrix printer is illustrated in conjunction with the disclosure of the present invention (without the ink ribbon), the structure and operation of the printer head 32 is not described in specific detail, as it is well known to those skilled in the art. Briefly, a dot matrix printer is controlled by a computer (not shown). The dot matrix printer head 32 has spring biased pins 34 which are held in a retracted position by a solenoid 36 controlled by the computer. To activate the pins 34 to fire out of or extend from the printer head 32 and impact a media, the solenoid 36 is de-energized. Since the pins 34 are spring biased, without the pull of the solenoid 36, the pins 34 fire out of the printer head 32. In FIG. 5, the pins 34 are shown in a retracted position in solid lines and in an extended position in phantom lines.

Figure 7:
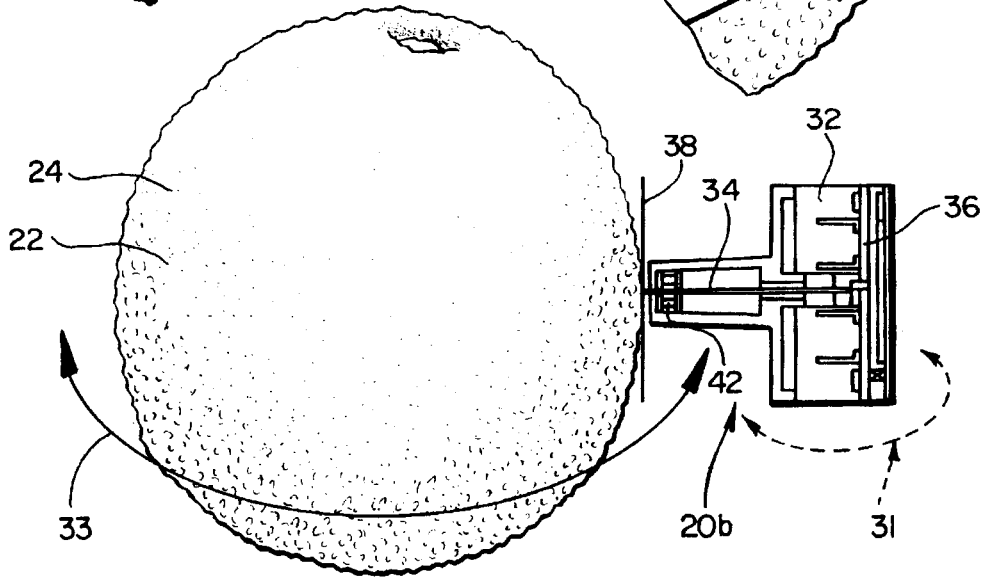
FIG. 7 is a top, schematic view of a produce marking system which incorporates the features of a third embodiment of the present invention.

The pins 34 of the dot matrix printer head 32 are at an elevated temperature due to friction and the heat generated by the solenoid 36, or through use of an optional heater element, FIGS. 3 and 7. Thus, when the pins 34 contact the media, a burn mark will be created on the media. After the pins 34 impact the media, the solenoid 36 is reactivated by a signal from the computer which pulls the pins 34 back to its retracted position.

Figure 6:
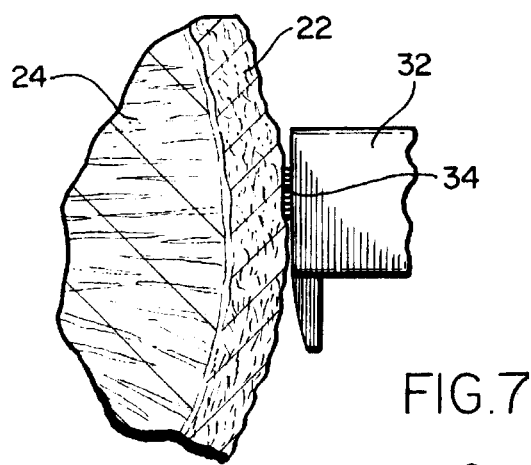
FIG. 6 is a partial, schematic view of the pins of the dot matrix printer head impacting the skin of a piece of produce, with the produce shown in cross-section and partially broken away, in accordance with the second embodiment of the present invention.
Figure 8:
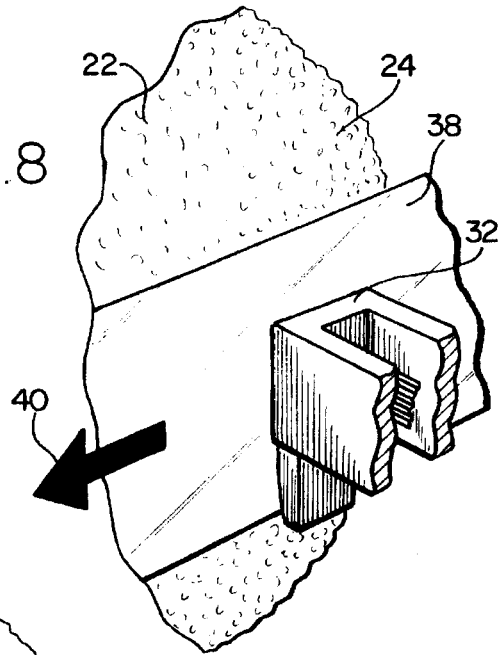
FIG. 8 is a partial, perspective view of the dot matrix printer head impacting the ribbon in accordance with the third embodiment of the present invention shown in FIGS. 7.

In the second embodiment 20a of the novel produce marking system disclosed herein, and as illustrated in FIGS. 3 and 6, the media which the pins 34 of the dot matrix printer head 32 contact when the pins 34 are fired is the skin 22 of the produce 24 itself. In the third embodiment 20b of the novel produce marking system disclosed herein, and as illustrated in FIGS. 7, 8 and 9, the pins 34 of the dot matrix printer head 32 may contact a thermally conductive and/or electrically conductive ribbon 38 which generally abuts the skin 22 of the piece of produce 24 and is disposed between the skin 22 and the printing head 32. Alternatively, in the third embodiment, the pins 34 need not make actual physical contact with the ribbon 38, and instead, the pins 34 may be spaced slightly from the electrically conductive ribbon 38 such that an electrical potential is created across the resulting gap to create an arc of electricity between the pins 34 and the ribbon 38, as explained hereinbelow. The arcing will produce heat which is transferred through the ribbon 38 to singe or burn the skin 22.

In the second 20a and third 20b embodiments of the produce marking system, relative movement or rotation between the piece of produce 24 and the dot matrix printer head 32 is employed as indicated by arrows 31 and 33, FIG. 3. Also, in the third embodiment 20b, the thermally conductive ribbon 38 moves horizontally as shown by the arrow 40 during the relative rotation between the piece of produce 24 and the dot matrix printer head 32. Thus, to print a line of characters, either the dot matrix printer head 32 moves horizontally, as shown by, for example, the dotted arrow in FIG. 3, along a track (not shown) across the piece of produce 24 with each pin 34 firing as necessary to burn or singe the appropriate mark on the skin 22 of the piece of produce 24 or, the dot matrix printer head 32 remains stationary and the piece of produce 24 rotates, as shown by, for example, the solid arrow in FIG. 3, along a track (not shown).

In the second embodiment 20a of the produce marking system, illustrated in FIGS. 3 and 6, the pins 34 of the dot matrix printer head 32 directly contact the skin 22 of the piece of produce 24. As shown in FIG. 6, the pins 34 of the dot matrix printer head 43 do not penetrate or cut into the skin 22 of the produce 24; the pins 34 press up against the skin 22 of the produce 24, which may cause a slight indentation, to burn or singe the mark onto the skin 22 of the produce 24. It is envisioned, however, that there may be some penetration of the skin 22 of the produce 24 by the pins 34 of the dot matrix printer head 32. The depth of the mark 26 on the skin 22 of the produce 24 depends on how long the pins 34 contact the skin 22.

Heat to raise the temperature of the pins 34 to the desired level is generated by friction and/or by convection from the solenoid 36, which acts as a heat sink, which heat tends to cauterize the skin 22 of the produce 24 around the burned or singed area. Thus, decay, disease and fungus are not invited since the meat of the produce 24 is not exposed to oxygen. As an alternate approach, suitable heating elements 42 may be included within the dot matrix printer head 32 near the end of the pins 34 which contact the produce 24. The heating elements 42 assure that a sufficient amount of heat is generated even during startup. A thermostat (not shown) may be included in the printer head 32 to prevent overheating.

The dot matrix printer may include a cleaning station (not shown) at the end of the line to remove any gum substance which may accumulate on the pins 34 due to direct contact with the skin 22 of the produce 24. Cleaning stations for use in dot matrix printers are well-known in the art and as such are not described herein.

In the third embodiment 20b of the produce marking system, shown in FIGS. 7, 8 and 9, the pins 34 of the dot matrix printer head 32 which are at an elevated temperature contact the strip of thermally conductive and/or electrically conductive ribbon 38 which generally abuts the skin 22 of the produce 24. The ribbon 38 may be an electrically and thermally conductive foil or ribbon, for example the ribbon 38 may have an aluminized material on one side, but it is envisioned that other types of ink free ribbons, such as paper, may be used, which permit heat to be applied to the skin while shielding the pins 34 and head 32 from any residue or vapors. The pins 34 contact the ribbon 38, and since the pins 34 are at an elevated temperature, a hot spot is created on the ribbon 38 which in turn burns or singes the skin 22 of the produce 24 to form a "dot" which is used to produce the desired marking. The depth of the mark 26 on the skin 22 of the produce 24 depends on how long the pins 34 contact the ribbon 38.

Alternatively, the pins 34 need not actually contact the ribbon 38. In this regard, the pins 34 could be placed in circuit or otherwise provided with an electrical potential. When advanced or fired, the pins 34 would not contact the electrically conductive foil, but would be disposed in closely spaced proximity. When this occurs, an electric potential is formed between the pins 34 and the ribbon 38 which creates an arc of electricity between the pins 34 and the ribbon 38. The arcs of the electric potential which form a hot spot on the ribbon 38 which burns or singes the skin 22 of the produce 24 in a like manner as to when the pins 34 are heated and actually, physically contact the ribbon 38.

The ribbon 38 protects the pins 34 and printer head 32 from any residue or vapors which may be generated during the burning or singeing process of the produce skin. This minimizes the amount of residue which may accumulate on the pins 34 of the printer head 32, and will avoid excessive cleaning. A conventional cleaning station (not shown) may be included in the design of the dot matrix printer. As noted above, the printer head 32 for embodiment 20b may include heating elements 42 to assure that a sufficient amount of heat is generated even during startup.

The embodiments of the produce marking system of the present invention can be operated at high speed and are reliable and flexible. With the disclosed embodiments, only the programming of the computer needs to be changed to create a new identifying mark.

While preferred embodiments of the present invention are shown and described, it is envisioned that those skilled in the art may devise various modifications of the present invention without departing from the spirit and scope of the appended claims. The invention is not intended to be limited by the foregoing disclosure.

The invention claimed is:

1. A method of marking the skin of a piece of produce with an identifying mark comprising the steps of:
   providing a piece of produce;
   providing a laser which emits a high intensity light beam to mark the skin of the produce and which laser light beam can be controlled such that a depth of the mark formed on said skin is controlled;
   relatively moving said piece of produce and said laser;

directing said laser light beam along a predetermined path along said produce skin which corresponds to said identifying mark to be applied on said produce skin; and controlling the depth the laser light beam impacts the produce skin such that identifying mark does not penetrate completely through the produce skin to the meat of the produce.

2. A method marking produce as defined in claim 1, wherein during the steps of directing said laser light beam along a predetermined path along said produce skin which corresponds to said identifying mark to be applied on said produce skin and controlling the depth the laser light beam impacts the produce skin such that identifying mark does not penetrate completely through the produce skin to the meat of the produce, the laser marks the skin of the produce to change the color of an area of the skin of the produce to form the identifying mark by contacting the area of the skin of the produce with said laser light beam.

3. A method marking produce as defined in claim 1, wherein during the steps of directing said laser light beam along a predetermined path along said produce skin which corresponds to said identifying mark to be applied on said produce skin and controlling the depth the laser light beam impacts the produce skin such that identifying mark does not penetrate completely through the produce skin to the meat of the produce, the laser marks the skin of the produce to etch an area of the skin of the produce to form the identifying mark by contacting the area of the skin of the produce with said laser light beam.

4. A method of marking the skin of a piece of produce with an identifying mark comprising the steps of:

providing a piece of produce;

providing a laser device which emits a high intensity light beam to produce an indicia on the skin of the piece of produce and which laser light beam can be controlled such that a depth of the mark formed on said skin is controlled;

effecting movement of the piece of produce past the laser device while effecting movement of the laser device relative to the piece of produce;

causing said light beam to produce an indicia on said piece of produce while directing said light beam along a predetermined path with respect to said piece of produce which applies said indicia to said produce; and controlling the depth the laser light beam impacts the produce skin such that identifying mark does not penetrate completely through the produce skin to the meat of the produce, such that the indicia produces the desired identifying mark on said produce skin.

* * * * *